(12) United States Patent
Miyamoto et al.

(10) Patent No.: US 10,213,727 B2
(45) Date of Patent: Feb. 26, 2019

(54) $CO_2$ RECOVERY DEVICE AND $CO_2$ RECOVERY METHOD

(71) Applicant: MITSUBISHI HEAVY INDUSTRIES, LTD., Tokyo (JP)

(72) Inventors: Osamu Miyamoto, Hiroshima (JP); Takashi Kamijo, Tokyo (JP); Tsuyoshi Oishi, Tokyo (JP); Shimpei Kawasaki, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 0 days.

(21) Appl. No.: 15/978,755

(22) Filed: May 14, 2018

(65) Prior Publication Data
US 2018/0257021 A1  Sep. 13, 2018

Related U.S. Application Data

(62) Division of application No. 15/128,056, filed as application No. PCT/JP2015/058498 on Mar. 20, 2015, now Pat. No. 9,993,767.

(30) Foreign Application Priority Data

Mar. 26, 2014 (JP) ................................ 2014-063913

(51) Int. Cl.
*B01D 17/12* (2006.01)
*B01D 19/00* (2006.01)
(Continued)

(52) U.S. Cl.
CPC ....... *B01D 53/1412* (2013.01); *B01D 3/4283* (2013.01); *B01D 17/12* (2013.01);
(Continued)

(58) Field of Classification Search
CPC ...... B01D 2252/20478; B01D 53/1412; B01D 53/1425; B01D 53/1475; B01D 53/18
See application file for complete search history.

(56) References Cited

U.S. PATENT DOCUMENTS 382,322 A    5/1888  Parsons
2011/0250120 A1* 10/2011  Tsubone ............ B01D 53/1425
                                                 423/437.1

FOREIGN PATENT DOCUMENTS

JP          56-1923 B1   1/1981
JP          63-72302 A   4/1988
(Continued)

OTHER PUBLICATIONS

International Search Report dated Apr. 21, 2015, issued in counterpart International Application No. PCT/JP2015/058498 (2 pages).
(Continued)

*Primary Examiner* — Cabrena Holecek
(74) *Attorney, Agent, or Firm* — Westerman, Hattori, Daniels & Adrian, LLP

(57) ABSTRACT

A $CO_2$ recovery device includes: a $CO_2$ absorption tower in which $CO_2$ included in an exhaust gas is absorbed by a $CO_2$ absorption liquid; and a $CO_2$ absorption liquid regeneration tower that heats and regenerates the $CO_2$ absorption liquid that has absorbed $CO_2$. The $CO_2$ absorption liquid regeneration tower includes: a main body part in which the $CO_2$ absorption liquid is temporarily stored; a boot part provided downward from a tank end of the main body part, having a relatively smaller capacity than the main body part; a flowmeter provided to the boot part, and measuring the liquid surface level of the $CO_2$ absorption liquid that changes between the main body part and the boot part; and a control device controlling the liquid surface level of the $CO_2$ absorption liquid between the main body part and the
(Continued)

boot part on the basis of the measurement result of the flowmeter.

5 Claims, 7 Drawing Sheets

(51) Int. Cl.
  *B01D 3/42* (2006.01)
  *B01D 53/14* (2006.01)
  *B01D 53/18* (2006.01)
  *C01B 32/50* (2017.01)
(52) U.S. Cl.
  CPC ..... *B01D 19/0015* (2013.01); *B01D 53/1425* (2013.01); *B01D 53/1475* (2013.01); *B01D 53/18* (2013.01); *C01B 32/50* (2017.08); *B01D 2252/20478* (2013.01); *B01D 2258/0283* (2013.01); *Y02C 10/06* (2013.01); *Y02P 20/152* (2015.11); *Y02P 70/34* (2015.11)

(56) References Cited

FOREIGN PATENT DOCUMENTS

| | | |
|---|---|---|
| JP | 4-126514 A | 4/1992 |
| JP | 11-137960 A | 5/1999 |
| JP | 3212524 B2 | 9/2001 |
| JP | 2010-201379 A | 9/2010 |
| JP | 2011-240321 A | 12/2011 |
| JP | 2012-110805 A | 6/2012 |
| WO | 2014/096251 A1 | 6/2014 |

OTHER PUBLICATIONS

Written Opinion of the International Search Authority dated Apr. 21, 2015, issued in counterpart International Application No. PCT/JP2015/058498 (4 pages).
Translation of Written Opinion dated Apr. 21, 2015, issued in counterpart Application No. PCT/JP2015/058498. (6 pages).
Extended (supplementary) European Search Report dated Jan. 31, 2017, issued in counterpart European Patent Application No. 15769414.2. (7 pages).

* cited by examiner

CO₂ RECOVERY DEVICE AND CO₂ RECOVERY METHOD

CROSS REFERENCE TO RELATED APPLICATIONS

This is a divisional of U.S. application Ser. No. 15/128,056, filed on Sep. 21, 2016, which is a 371 of PCT/JP2015/058498 filed Mar. 20, 2015, which claims the benefit of foreign priority of Japanese Application No. 2014-0639313 filed Mar. 26, 2014, the entire contents of which is incorporated herein by reference.

TECHNICAL FIELD

The invention relates to a $CO_2$ recovery device and a $CO_2$ recovery method, and particularly to a $CO_2$ recovery device and a $CO_2$ recovery method that recover $CO_2$ in a gas to be treated, using a $CO_2$ absorption liquid.

BACKGROUND ART

In the related art, $CO_2$ recovery devices that recover $CO_2$ exhausted from boilers or the like of thermoelectric power plants are suggested (for example, refer to PTL 1). In the $CO_2$ recovery devices, after an exhaust gas is introduced into a $CO_2$ absorption tower and a $CO_2$ absorption liquid is brought into contact with $CO_2$ contained in the exhaust gas to absorb $CO_2$, the $CO_2$ absorption liquid that has absorbed $CO_2$ is fed to a $CO_2$ absorption liquid regeneration tower, is heated, and is decarboxylated, and a high-concentration $CO_2$ gas is recovered therefrom. The $CO_2$ absorption liquid is used and circulated between the $CO_2$ absorption tower and the $CO_2$ absorption liquid regeneration tower by supplying the $CO_2$ absorption liquid after decarboxylation with a pump.

CITATION LIST

Patent Literature

PTL 1: Japanese Patent No. 3212524

SUMMARY OF INVENTION

Technical Problem

Meanwhile, in a tower bottom part of the $CO_2$ absorption liquid regeneration tower, the liquid surface level of the $CO_2$ absorption liquid is controlled to be within a predetermined range using a flowmeter in order to prevent cavitation of the pump that feeds the $CO_2$ absorption liquid to the $CO_2$ absorption tower. However, in the $CO_2$ absorption liquid regeneration tower of the related-art $CO_2$ recovery devices, it is necessary to secure a given amount of $CO_2$ absorption liquid in the tower bottom part in order to stably feed the $CO_2$ absorption liquid, and there is a case where the $CO_2$ absorption liquid stored in the tower bottom part may thermally deteriorate.

The invention has been made in view of such circumstances, and an object thereof is to provide a $CO_2$ recovery device and a $CO_2$ recovery method with which it is possible to reduce the thermal degradation of a $CO_2$ absorption liquid at the time of regeneration.

Solution to Problem

A $CO_2$ recovery device of the invention includes a $CO_2$ absorption tower in which $CO_2$ contained in a gas to be treated is absorbed by a $CO_2$ absorption liquid by bringing the gas to be treated into contact with the $CO_2$ absorption liquid; and a $CO_2$ absorption liquid regeneration tower that heats the $CO_2$ absorption liquid, which has absorbed $CO_2$, to release $CO_2$ from the $CO_2$ absorption liquid to regenerate the $CO_2$ absorption liquid. The $CO_2$ absorption liquid regeneration tower includes a first storage part in which the $CO_2$ absorption liquid is temporarily stored, a second storage part that is provided downward from a bottom part of the first storage part and that has a relatively smaller capacity than the first storage part, a liquid level measuring device that is disposed at the second storage part and that measures the liquid surface level of the $CO_2$ absorption liquid that changes between the first storage part and the second storage part, and a control device that controls the liquid surface level of the $CO_2$ absorption liquid between the first storage part and the second storage part on the basis of the measurement result of the liquid level measuring device.

According to the $CO_2$ recovery device, the second storage part having a relatively smaller capacity than the first storage part is provided. Thus, the liquid volume of the $CO_2$ absorption liquid required to be stably fed from the $CO_2$ absorption liquid regeneration tower to the $CO_2$ absorption tower can be reduced. Accordingly, the $CO_2$ recovery device can reduce the residence time of the $CO_2$ absorption liquid within the $CO_2$ absorption liquid regeneration tower, and can reduce the thermal deterioration of the $CO_2$ absorption liquid at the time of regeneration. Moreover, in a case where the liquid volume of the $CO_2$ absorption liquid is reduced, since the second storage part having a relatively smaller capacity than the first storage part is provided below the first storage part, a sufficient height can thus be secured, and entrainment of gas within the $CO_2$ absorption liquid regeneration tower accompanying feeding of the $CO_2$ absorption liquid can be prevented.

In the $CO_2$ recovery device of the invention, it is preferable that an internal diameter d2 of the second storage part is relatively smaller than an internal diameter d1 of the first storage part. By virtue of this configuration, since it is possible to further reduce the liquid volume of the $CO_2$ absorption liquid required to be stably fed from the $CO_2$ absorption liquid regeneration tower to the $CO_2$ absorption tower, the residence time of the $CO_2$ absorption liquid within the $CO_2$ absorption liquid regeneration tower can be reduced, and the thermal deterioration of the $CO_2$ absorption liquid at the time of regeneration can be further reduced.

In the $CO_2$ recovery device of the invention, it is preferable that a ratio (d2:d1) of the internal diameter d2 of the second storage part to the internal diameter d1 of the first storage part is within a range of 1:10 to 1:2. By virtue of this configuration, since it is possible to further reduce the liquid volume of the $CO_2$ absorption liquid required to be stably fed from the $CO_2$ absorption liquid regeneration tower to the $CO_2$ absorption tower, the residence time of the $CO_2$ absorption liquid within the $CO_2$ absorption liquid regeneration tower can be reduced, and the thermal deterioration of the $CO_2$ absorption liquid at the time of regeneration can be further reduced.

In the $CO_2$ recovery device of the invention, it is preferable that the second storage part is a cylindrical member provided at a bottom part of the $CO_2$ absorption liquid regeneration tower. By virtue of this configuration, since it is possible to further reduce the liquid volume of the $CO_2$ absorption liquid required to be stably fed from the $CO_2$ absorption liquid regeneration tower to the $CO_2$ absorption tower, the residence time of the $CO_2$ absorption liquid within the $CO_2$ absorption liquid regeneration tower can be reduced, and the thermal deterioration of the $CO_2$ absorption liquid at the time of regeneration can be further reduced.

In the $CO_2$ recovery device of the invention, it is preferable that a liquid flow speed of the $CO_2$ absorption liquid to be fed from the inside of the second storage part to the $CO_2$ absorption tower is equal to or lower than 0.3 m/s. By virtue of this configuration, since the liquid flow speed of the $CO_2$ absorption liquid is within a moderate range, entrainment of gas within the $CO_2$ absorption liquid regeneration tower accompanying feeding of the $CO_2$ absorption liquid can be prevented.

A $CO_2$ recovery method of the invention includes a $CO_2$ absorption process of bringing a gas to be treated into contact with a $CO_2$ absorption liquid, thereby causing $CO_2$ contained in the gas to be treated to be absorbed by the $CO_2$ absorption liquid; and a $CO_2$ absorption liquid regeneration process of heating the $CO_2$ absorption liquid, which has absorbed $CO_2$, in a $CO_2$ absorption liquid regeneration tower, to release $CO_2$ from the $CO_2$ absorption liquid to regenerate the $CO_2$ absorption liquid. In the $CO_2$ absorption liquid regeneration process, the liquid surface level of the $CO_2$ absorption liquid that changes between a first storage part in which the $CO_2$ absorption liquid in the $CO_2$ absorption liquid regeneration tower is temporarily stored, and a second storage part having a relatively smaller capacity than the first storage part is measured, and the liquid surface level of the $CO_2$ absorption liquid is controlled between the first storage part and the second storage part on the basis of the measured liquid surface level.

According to the $CO_2$ recovery method, the second storage part having a relatively smaller capacity than the first storage part is provided. Thus, the liquid volume of the $CO_2$ absorption liquid required to be stably fed from the $CO_2$ absorption liquid regeneration tower to the $CO_2$ absorption tower can be reduced. Accordingly, the $CO_2$ recovery method can reduce the residence time of the $CO_2$ absorption liquid within the $CO_2$ absorption liquid regeneration tower, and can reduce the thermal deterioration of the $CO_2$ absorption liquid at the time of regeneration. Moreover, in a case where the liquid volume of the $CO_2$ absorption liquid is reduced, the second storage part having a relatively smaller capacity than the first storage part is provided below the first storage part. Thus, the height of liquid surface level can be secured, and entrainment of gas within the $CO_2$ absorption liquid regeneration tower accompanying feeding of the $CO_2$ absorption liquid can be prevented.

In the $CO_2$ recovery method of the invention, it is preferable that an internal diameter d2 of the second storage part is relatively smaller than an internal diameter d1 of the first storage part. By virtue of this $CO_2$ recovery method, since it is possible to further reduce the liquid volume of the $CO_2$ absorption liquid required to be stably fed from the $CO_2$ absorption liquid regeneration tower to the $CO_2$ absorption tower, the residence time of the $CO_2$ absorption liquid within the $CO_2$ absorption liquid regeneration tower can be reduced, and the thermal deterioration of the $CO_2$ absorption liquid at the time of regeneration can be further reduced.

In the $CO_2$ recovery method of the invention, it is preferable that a ratio (d2:d1) of the internal diameter d2 of the second storage part to the internal diameter d1 of the first storage part is within a range of 1:10 to 1:2. By virtue of this $CO_2$ recovery method, since it is possible to further reduce the liquid volume of the $CO_2$ absorption liquid required to be stably fed from the $CO_2$ absorption liquid regeneration tower to the $CO_2$ absorption tower, the residence time of the $CO_2$ absorption liquid within the $CO_2$ absorption liquid regeneration tower can be reduced, and the thermal deterioration of the $CO_2$ absorption liquid at the time of regeneration can be further reduced.

In the $CO_2$ recovery method of the invention, it is preferable that the second storage part is a cylindrical member provided at a bottom part of the $CO_2$ absorption liquid regeneration tower. By virtue of this $CO_2$ recovery method, since it is possible to further reduce the liquid volume of the $CO_2$ absorption liquid required to be stably fed from the $CO_2$ absorption liquid regeneration tower to the $CO_2$ absorption tower, the residence time of the $CO_2$ absorption liquid within the $CO_2$ absorption liquid regeneration tower can be reduced, and the thermal deterioration of the $CO_2$ absorption liquid at the time of regeneration can be further reduced.

In the $CO_2$ recovery method of the invention, it is preferable that a liquid flow speed of the $CO_2$ absorption liquid to be fed from the inside of the second storage part to the $CO_2$ absorption tower is equal to or lower than 0.3 m/s. By virtue of this method, since the liquid flow speed of the $CO_2$ absorption liquid is within a moderate range, entrainment of gas within the $CO_2$ absorption liquid regeneration tower accompanying feeding of the $CO_2$ absorption liquid can be prevented.

Advantageous Effects of Invention

According to the invention, a $CO_2$ recovery device and a $CO_2$ recovery method with which it is possible to reduce the thermal degradation of a $CO_2$ absorption liquid at the time of regeneration can be realized.

DESCRIPTION OF EMBODIMENTS

The present inventors have paid their attention to the fact that, in related-art $CO_2$ recovery devices, a $CO_2$ absorption liquid thermally deteriorates depending on the residence time of the $CO_2$ absorption liquid within a $CO_2$ absorption liquid regeneration tower that heats the $CO_2$ absorption liquid to regenerate the $CO_2$ absorption liquid. The present inventors have also found that a lower part of a tower main body part serving as a first storage part of the $CO_2$ absorption liquid regeneration tower is provided with a second storage part with a relatively smaller capacity than the main body part, so that the liquid volume of the $CO_2$ absorption liquid that needs to be secured in the tower bottom part of the $CO_2$ absorption liquid regeneration tower in order to stably feed the liquid to the $CO_2$ absorption tower can be reduced and so that the residence time of the $CO_2$ absorption liquid within the $CO_2$ absorption liquid regeneration tower can be reduced and the thermal deterioration of the $CO_2$ absorption liquid can be prevented, and have completed the invention.

Hereinafter, embodiments of the invention will be described in detail with reference to the accompanying drawings. In addition, the invention is not limited to the following embodiments, can be appropriately changed and carried out. Additionally, the configurations of $CO_2$ recovery devices related to the following respective embodiments can be appropriately combined and carried out.

Figure 1:
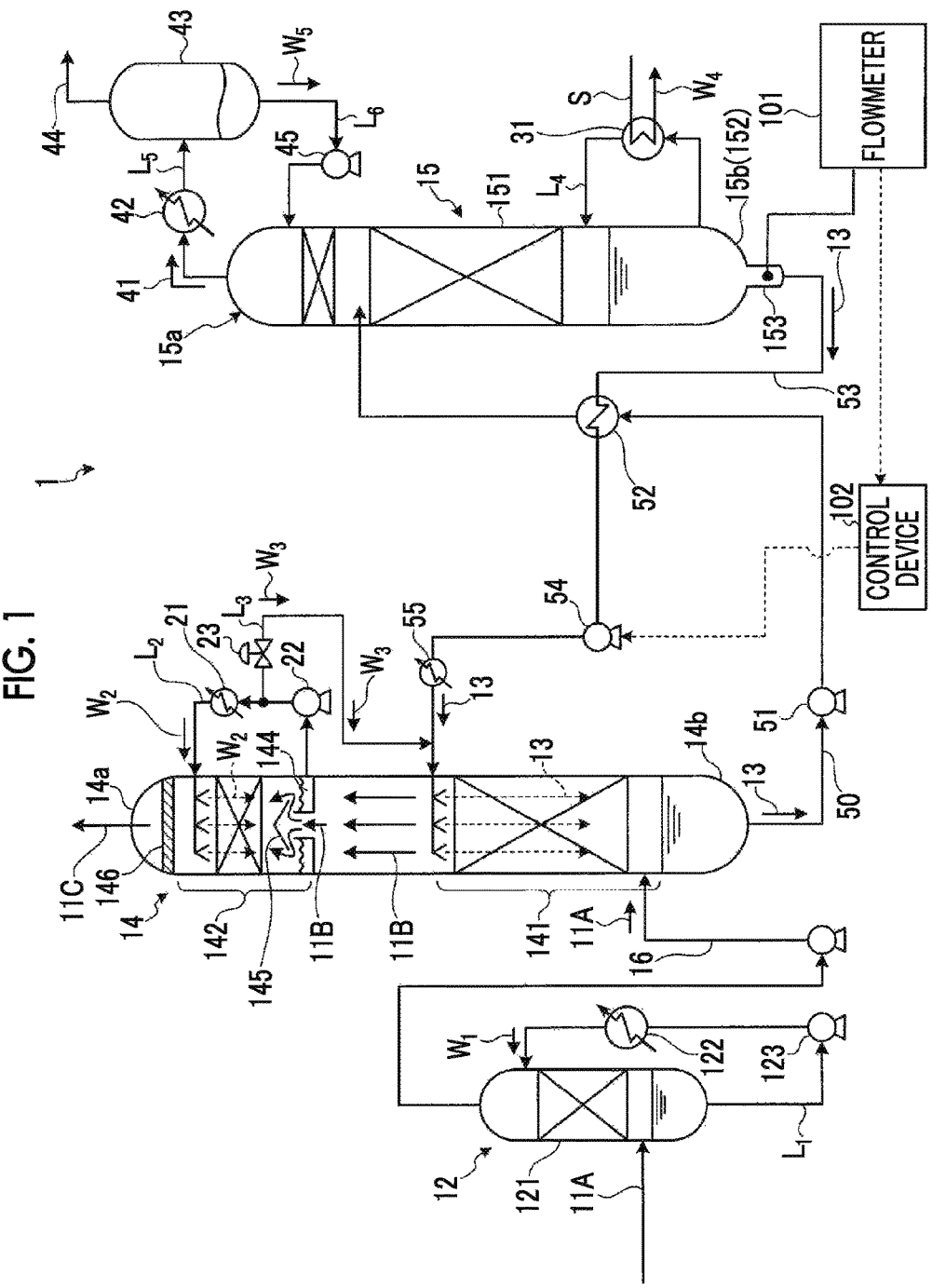
FIG. 1 is a schematic view of a $CO_2$ recovery device related to a first embodiment.

FIG. 1 is a schematic view of a $CO_2$ recovery device related to an embodiment of the invention. As illustrated in FIG. 1, the $CO_2$ recovery device 1 is an apparatus that absorbs $CO_2$ in an exhaust gas (a gas to be treated) 11A containing $CO_2$ exhausted from industrial facilities, such as a boiler and a gas turbine, and recovers a high-concentration $CO_2$ gas. The $CO_2$ recovery device 1 includes a cooling tower 12 that cools an exhaust gas 11A containing $CO_2$ exhausted from industrial facilities, such as a boiler and a gas turbine; a $CO_2$ absorption tower 14 that is provided in a subsequent stage of the cooling tower 12, brings the cooled exhaust gas 11A into contact with a $CO_2$ absorption liquid 13, and makes the $CO_2$ absorption liquid 13 absorb and remove $CO_2$ in the exhaust gas 11A; and a $CO_2$ absorption liquid regeneration tower 15 that is provided in the subsequent stage of the $CO_2$ absorption tower 14, releases $CO_2$ from the $CO_2$ absorption liquid 13 that has absorbed the $CO_2$, and regenerates the $CO_2$ absorption liquid 13.

In the $CO_2$ recovery device 1, the $CO_2$ absorption liquid 13 circulates between the $CO_2$ absorption tower 14 and the $CO_2$ absorption liquid regeneration towers 15. The $CO_2$ absorption liquid 13 (lean solution) absorbs $CO_2$ in the $CO_2$ absorption tower 14, and is supplied to the $CO_2$ absorption liquid regeneration tower 15 as the $CO_2$ absorption liquid 13 (rich solution). Additionally, the $CO_2$ absorption liquid 13 (rich solution) has substantially all $CO_2$ removed and regenerated in the $CO_2$ absorption liquid regeneration tower 15, and is supplied to the $CO_2$ absorption tower 14 as the $CO_2$ absorption liquid 13 (lean solution).

The cooling tower 12 has a cooling section 121 that cools the exhaust gas 11A. A circulation line $L_1$ is provided between a bottom part of the cooling tower 12 and a top part of the cooling section 121. A heat exchanger 122 that cools cooling water $W_1$, and a circulation pump 123 circulate the cooling water $W_1$ within the circulation line $L_1$ are provided in the circulation line $L_1$.

In the cooling section 121, the exhaust gas 11A is cooled by bringing the exhaust gas 11A into countercurrent contact with the cooling water $W_1$. The heat exchanger 122 cools the cooling water $W_1$ heated by the heat exchange with the exhaust gas 11A. The circulation pump 123 supplies the cooling water $W_1$, which has flowed down to the bottom part of the cooling tower 12, to the top part of the cooling section 121 via the heat exchanger 122.

The $CO_2$ absorption tower 14 includes a $CO_2$ absorption section 141 that is provided on a lower part side of the $CO_2$ absorption tower 14 and has the exhaust gas 11A cooled in the cooling tower 12 supplied thereto, a washing section 142 that is provided on an upper part side of the $CO_2$ absorption tower 14. A liquid storage section 144 that stores cleaning water $W_2$ for cleaning an exhaust gas 11B from which $CO_2$ has been removed is provided at a bottom part of the washing section 142. A circulation line $L_2$, through which the cleaning water $W_2$, containing the $CO_2$ absorption liquid 13 recovered in the liquid storage section 144, is supplied and circulated from a top part side of the washing section 142, is provided between the liquid storage section 144 and an upper part of the washing section 142. The circulation line $L_2$ is provided with a heat exchanger 21 that cools the cleaning water $W_2$, and a circulation pump 22 that circulates the cleaning water $W_2$, containing the $CO_2$ absorption liquid recovered in the liquid storage section 144, within the circulation line $L_2$ via the heat exchanger 21. Additionally, the circulation line $L_2$ is provided with an extraction line $L_3$ through which a portion of the cleaning water $W_2$ (cleaning water $W_3$) is extracted and supplied to the $CO_2$ absorption section 141. The extraction line $L_3$ is provided with an adjusting valve 23 that adjusts the amount of supply of cleaning water $W_3$ supplied to the $CO_2$ absorption liquid 13 (lean solution).

In the $CO_2$ absorption section 141, the exhaust gas 11A containing $CO_2$ and the $CO_2$ absorption liquid 13 containing alkanolamine or the like come into countercurrent contact with each other. Accordingly, $CO_2$ in the exhaust gas 11A is absorbed by the $CO_2$ absorption liquid 13 through a chemical reaction shown in the following Formula. As a result, the exhaust gas 11A containing $CO_2$ becomes an exhaust gas 11B from which $CO_2$ has been removed by passing through the $CO_2$ absorption section 141.

$$R\text{—}NH_2 + H_2O + CO_2 \rightarrow R\text{—}NH_3HCO_3$$

In the washing section 142, the exhaust gas 11B from which $CO_2$ has been removed rises via a chimney tray 145. Then, the exhaust gas 11B is brought into gas-liquid contact with the cleaning water $W_2$ supplied from the top part side of the washing section 142, and becomes an exhaust gas 11C from which the $CO_2$ absorption liquid 13 entrained in the exhaust gas 11B has been recovered by circulation cleaning. The exhaust gas 11C is exhausted to the outside from the tower top part 14a of the $CO_2$ absorption tower 14 after mist in the gas is trapped by a mist eliminator 146.

A rich solution supply tube 50 through which the $CO_2$ absorption liquid 13 (rich solution), which has absorbed $CO_2$ in the $CO_2$ absorption tower 14, is supplied to an upper part side of the $CO_2$ absorption liquid regeneration tower 15, is provided between a tower bottom part 14b of the $CO_2$ absorption tower 14 and an upper part of the $CO_2$ absorption liquid regeneration tower 15. The rich solution supply tube 50 is provided with a rich solvent pump 51 that supplies the $CO_2$ absorption liquid 13 (rich solution), which has absorbed $CO_2$ in the $CO_2$ absorption tower 14, toward the $CO_2$ absorption liquid regeneration tower 15, and a rich-lean solution heat exchanger 52 that heats the $CO_2$ absorption liquid 13 (rich solution) that has absorbed $CO_2$, using the $CO_2$ absorption liquid 13 (lean solution) which has been heated with steam and from which $CO_2$ has been removed.

The $CO_2$ absorption liquid regeneration tower 15 includes a main body part (first capacity part) 151 that is provided at a central part of the $CO_2$ absorption liquid regeneration tower 15 and has the $CO_2$ absorption liquid 13, which has absorbed $CO_2$, supplied thereto, and a tank end 152 of a tower bottom part 15b of a lower part of the main body part 151, and a boot part (second capacity part) 153 that is provided at a bottom part of the tank end 152. The boot part 153 is provided downward from a bottom part of the tank end 152. The boot part 153 is provided with a flowmeter (liquid level measuring device) 101 that measures the liquid surface level of $CO_2$ absorption liquid supplied from the $CO_2$ absorption liquid regeneration tower 15 to the $CO_2$ absorption tower 14. The liquid surface level measured by the flowmeter 101 is transmitted to a control device 102.

A bottom part of the boot part 153 of the $CO_2$ absorption liquid regeneration tower 15 is provided with a circulation line $L_4$ through which the $CO_2$ absorption liquid that has flowed down to the tower bottom part circulates. The circulation line $L_4$ is provided with a regenerative heater 31 that heats the $CO_2$ absorption liquid 13 with saturated steam S.

A tower top part 15a of the $CO_2$ absorption liquid regeneration tower 15 is provided with a gas emission line $L_5$ through which a $CO_2$ gas 41 accompanied by steam is exhausted. The gas emission line $L_5$ is provided with a condenser 42 that condenses moisture in the $CO_2$ gas 41, and a separation drum 43 that separate the $CO_2$ gas 41 from condensed water $W_5$. A $CO_2$ gas 44 from which the condensed water $W_5$ has been separated is released to the outside from an upper part of the separation drum 43. A condensed water line $L_6$ through which the condensed water $W_5$ separated by the separation drum 43 is supplied to the upper part of the $CO_2$ absorption liquid regeneration tower 15 is provided between a bottom part of the separation drum 43 and the upper part of the $CO_2$ absorption liquid regeneration tower 15. The condensed water line $L_6$ is provided with a condensed water circulation pump 45 that supplies the condensed water $W_5$ separated by the separation drum 43 to the upper part of the $CO_2$ absorption liquid regeneration tower 15.

Additionally, the tower bottom part of the $CO_2$ absorption liquid regeneration tower 15 and an upper part of the $CO_2$ absorption section 141 of the $CO_2$ absorption tower 14 are provided with a lean solution supply tube 53 through which the $CO_2$ absorption liquid 13 (lean solution) in the tower bottom part of the $CO_2$ absorption liquid regeneration tower 15 is supplied to the upper part of the $CO_2$ absorption section 141. The lean solution supply tube 53 is provided with the rich-lean solution heat exchanger 52 that heats the $CO_2$ absorption liquid 13 (rich solution), which has absorbed $CO_2$, using the $CO_2$ absorption liquid 13 (lean solution) which has been heated with steam and from which $CO_2$ has been removed, a lean solution pump 54 that supplies the lean solution in the tower bottom part of the $CO_2$ absorption liquid regeneration tower 15 to the upper part of the $CO_2$ absorption section 141, and a cooling section 55 that cools the $CO_2$ absorption liquid 13 (lean solution) to a predetermined temperature. In the lean solution pump 54, the amount of supply of the $CO_2$ absorption liquid 13 (lean solution) is controllable by the control device 102.

Figure 2:
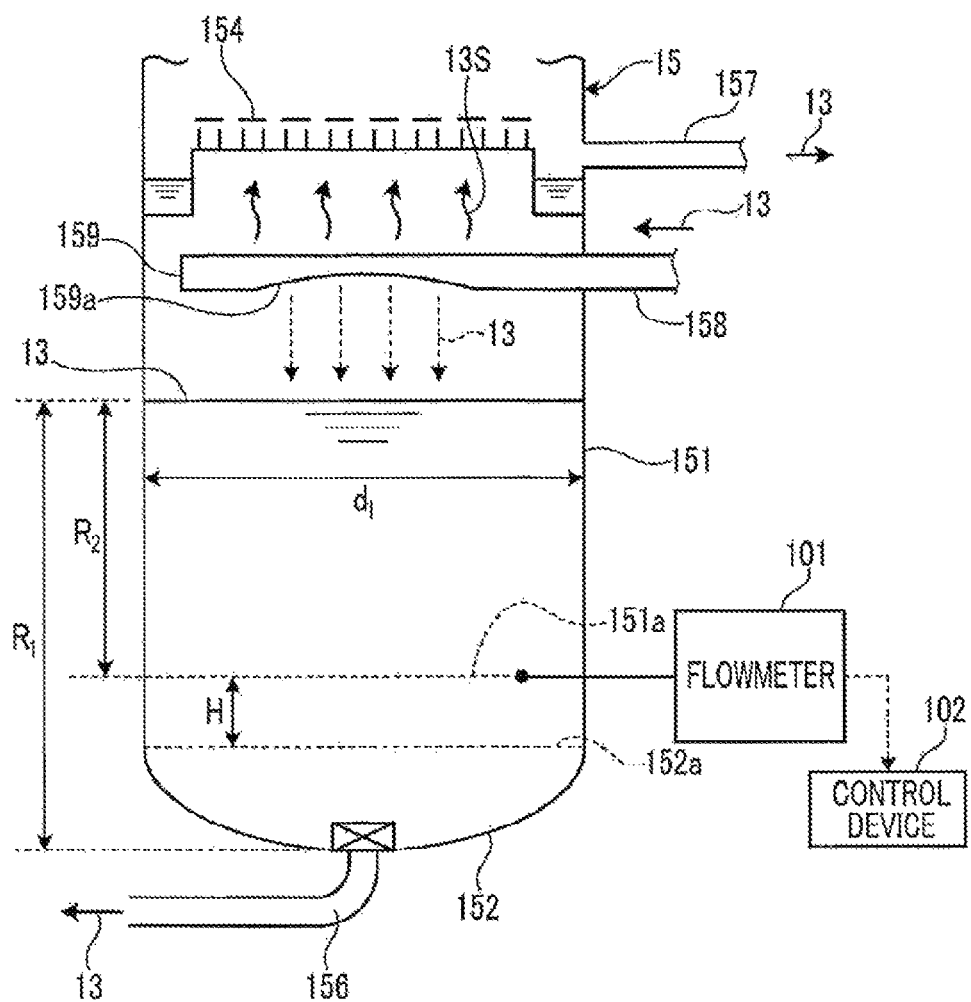
FIG. 2 is a schematic enlarged view of a tower bottom part of a general $CO_2$ absorption liquid regeneration tower.
Figure 3:
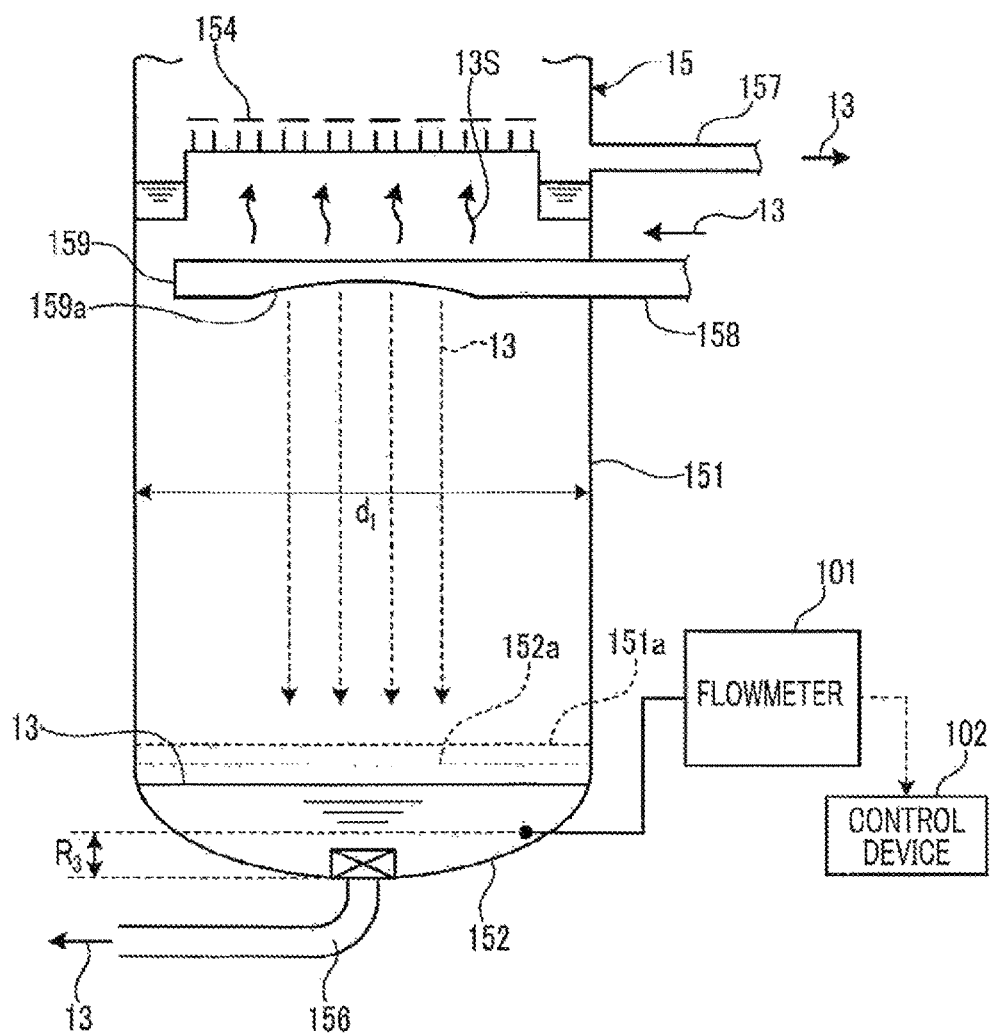
FIG. 3 is a schematic enlarged view of the tower bottom part of the general $CO_2$ absorption liquid regeneration tower.
Figure 4:
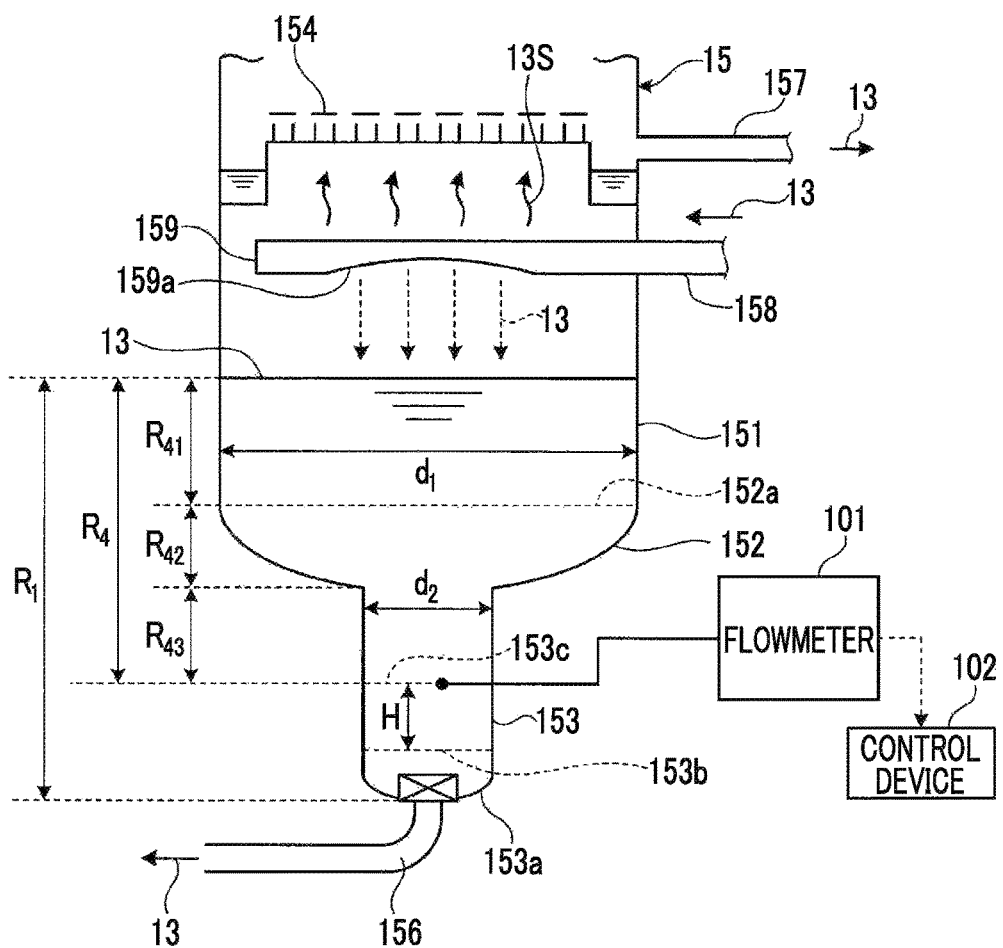
FIG. 4 is a schematic enlarged view of the tower bottom part of the $CO_2$ absorption liquid regeneration tower related to the present embodiment.
Figure 5:
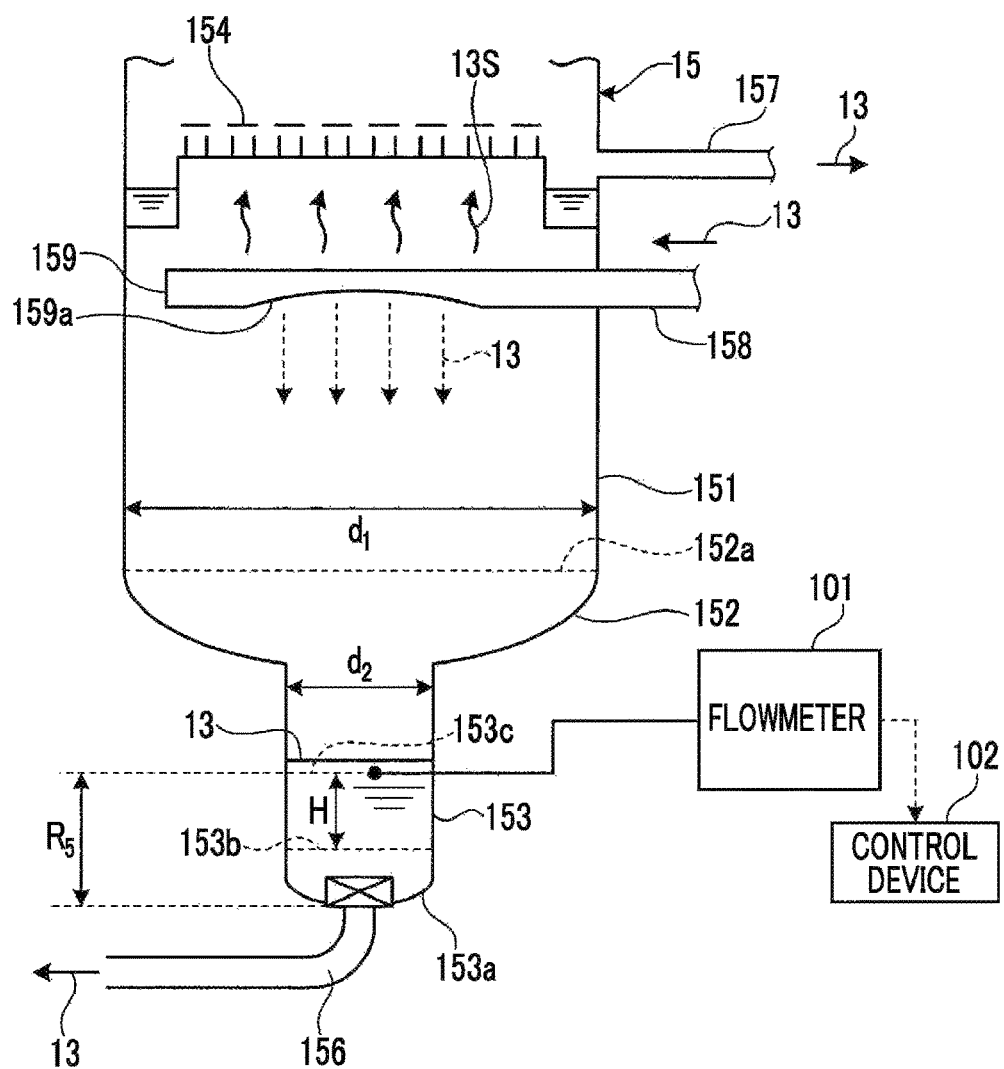
FIG. 5 is a schematic enlarged view of the tower bottom part of the $CO_2$ absorption liquid regeneration tower related to the present embodiment.

Next, the control of the liquid surface level of the $CO_2$ absorption liquid 13 of the $CO_2$ absorption liquid regeneration tower 15 in the $CO_2$ recovery device 1 will be described in detail with reference to FIGS. 2 to 5. FIGS. 2 and 3 are schematic enlarged views of the tower bottom part 15b of the general $CO_2$ absorption liquid regeneration tower 15, and FIGS. 4 and 5 are schematic enlarged views of the tower bottom part 15b of the $CO_2$ absorption liquid regeneration tower 15 related to the present embodiment. In addition, for convenience of description, illustration of devices, such as a reboiler, are omitted in FIGS. 2 to 5.

As illustrated in FIG. 2, the general $CO_2$ absorption liquid regeneration tower 15 includes a cylindrical main body part 151 that has a predetermined internal diameter d1, and a curved tank end 152 that is provided at the lower part of the main body part 151. An upper part of the main body part 151 is provided with a chimney tray 154 in which a plurality of through-holes are provided. Steam 13S generated by the $CO_2$ absorption liquid 13 stored in the tower bottom part of the $CO_2$ absorption liquid regeneration tower 15 being heated rises via the chimney tray 154. A bottom part of the tank end 152 is provided with a liquid feed tube 156 through which the $CO_2$ absorption liquid 13 is fed toward the $CO_2$ absorption tower 14.

Additionally, the upper part of the main body part 151 is provided with a liquid feed tube 157 through which the $CO_2$ absorption liquid 13 stored at an outer peripheral edge of the chimney tray 154 is extracted and fed to a reboiler (not illustrated), and a liquid feed tube 158 through which the $CO_2$ absorption liquid 13 as a gas-liquid mixture that has been heated by the reboiler (for example, 120° C.) and has been partially evaporated, is fed into the $CO_2$ absorption liquid regeneration tower 15. A dispersion device 159 that disperses the $CO_2$ absorption liquid 13 as the gas-liquid mixture into the $CO_2$ absorption liquid regeneration tower 15 is connected to this liquid feed tube 158. The dispersion device 159 is a substantially cylindrical member that has a cutout part 159a provided at a central part thereof, and disperses the $CO_2$ absorption liquid 13 as the gas-liquid mixture downward from the cutout part 159a.

The $CO_2$ absorption liquid 13 is temporarily stored in a predetermined range R1 from the bottom of the tank end 152 of the main body part 151. The $CO_2$ absorption liquid 13 stored in this range is the $CO_2$ absorption liquid 13 that needs to be secured in order to stably feed the $CO_2$ absorption liquid 13 from the $CO_2$ absorption liquid regeneration tower 15 to the $CO_2$ absorption tower 14. Additionally, the main body part 151 is provided with the flowmeter 101 that measures the liquid surface level of the $CO_2$ absorption liquid 13 stored in the predetermined range R1. The liquid surface level measured by the flowmeter 101 is transmitted by the control device 102. The control device 102 adjusts the liquid feed amount of the lean solution pump 54 that feeds the liquid from the $CO_2$ absorption liquid regeneration tower 15 to the $CO_2$ absorption tower 14 according to the liquid surface level measured by the flowmeter 101.

The flowmeter 101 is installed at a predetermined height H from an upper end 152a of the tank end 152 in the general $CO_2$ absorption liquid regeneration tower 15. Accordingly, by controlling the liquid volume of the $CO_2$ absorption liquid 13 in a predetermined range R2 between an upper end of the predetermined range R1 and the flowmeter 101, the distance from a control liquid surface level to the liquid feed tube 156 is maintained while securing the liquid volume of the $CO_2$ absorption liquid 13 required in order to stably feed the $CO_2$ absorption liquid 13 from the absorption liquid regeneration tower 15 to the $CO_2$ absorption tower 14. Therefore, it is also possible to prevent gas entrainment to the liquid feed tube 156. In a case where the liquid surface level of the $CO_2$ absorption liquid 13 has fallen to a lower end of the predetermined range R2, the control device 102 stops the liquid feed of the $CO_2$ absorption liquid 13 from the lean solution pump 54, in order to prevent cavitation of the lean solution pump 54. By installing the flowmeter 101 to control the liquid surface level of the predetermined range R2 in this way, entrainment of bubbles generated when the $CO_2$ absorption liquid 13 is dispersed by the dispersion device and is supplied into the $CO_2$ absorption liquid regeneration tower 15 can be prevented.

Meanwhile, as described above, in the general $CO_2$ absorption liquid regeneration tower 15, it is always necessary to secure a predetermined amount of the $CO_2$ absorption liquid 13 at a portion below the lower end of the predetermined range R2 in order to stably feed the $CO_2$ absorption liquid 13 from the $CO_2$ absorption liquid regeneration tower 15 to the $CO_2$ absorption tower 14. For this reason, the portion below the lower end of the predetermined range R2 including the tank end 152 may becomes dead space where the $CO_2$ absorption liquid 13 always stagnates, and the thermal deterioration of the $CO_2$ absorption liquid 13 may increase.

Thus, for example, as illustrated in FIG. 3, it is also considered that the flowmeter 101 is installed in the tank end 152, and the liquid volume of the $CO_2$ absorption liquid 13 required in order to stably feed the liquid from the $CO_2$ absorption liquid regeneration tower 15 to the $CO_2$ absorption tower 14 is reduced to the predetermined range R3 between the upper end 152a of the tank end 152 and the tower bottom part 15b of the $CO_2$ absorption liquid regeneration tower 15. However, in this case, since the distance between the liquid surface level of the $CO_2$ absorption liquid 13 stored in the tower bottom part, and the liquid feed tube 156 becomes small, bubbles generated when the $CO_2$ absorption liquid 13 that is dispersed by the dispersion device 159 and falls down has come into contact with the $CO_2$ absorption liquid 13 stored in the tower bottom part is apt to enter the liquid feed tube 156. Additionally, even in this case, a predetermined capacity of dead space is still generated in the portion where the liquid volume of the $CO_2$ absorption liquid 13 is equal to or lower than the lower end of the predetermined range R3.

Thus, in the present embodiment, as illustrated in FIG. 4, the $CO_2$ absorption liquid regeneration tower 15 is provided with the cylindrical main body part 151 (first storage part) having the predetermined internal diameter d1, the tank end 152 having a curved surface part provided at the lower part of the main body part 151, and the boot part (second storage part) 153 as a cylindrical member provided downward from the bottom part of the tank end 152 at the bottom part of the tank end 152. The liquid feed tube 156 is provided at the bottom part of the tank end 153a of the boot part 153. The $CO_2$ absorption liquid 13 is temporarily stored in the main body part 151, the tank end 152, and the boot part 153. The boot part 153 has a relatively smaller internal diameter d2 than the internal diameter d1 of the main body part 151. A ratio (d2:d1) of the internal diameter d1 of the main body part 151 to the internal diameter d2 of the boot part 153 is, for example, 1:5. The $CO_2$ absorption liquid 13 is temporarily stored in the main body part 151 so as to reach a predetermined height R1 from the bottom of the boot part 153. The flowmeter 101 is installed at a predetermined height H from an upper end 153b of the tank end 153a at a lower end of the boot part 153, and measures the liquid surface level of the $CO_2$ absorption liquid 13 within the boot part 153. The liquid surface level within the boot part 153 measured by this flowmeter 101 is transmitted by the control device 102. The control device 102 adjusts the liquid volume of the $CO_2$ absorption liquid 13 to be fed from the tower bottom part 15b of the $CO_2$ absorption liquid regeneration tower 15 by the lean solution pump 54 according to the liquid surface level within the boot part 153 measured by the flowmeter 101.

In the $CO_2$ absorption liquid regeneration tower 15 related to the present embodiment, the boot part 153 having a relatively smaller capacity than the main body part 151 is provided at a lower part of the tank end 152. Thus, it is possible to reduce the liquid volume of the $CO_2$ absorption liquid 13 that needs to be secured in order to be stably fed to the $CO_2$ absorption tower 14 from the $CO_2$ absorption liquid regeneration tower 15, as compared to the general $CO_2$ absorption liquid regeneration tower 15 illustrated in FIG. 2. Accordingly, as illustrated in FIG. 5, it is possible to reduce the dead space of the $CO_2$ absorption liquid 13 generated at a lower part of the $CO_2$ absorption liquid regeneration tower 15 to the range of R5. Thus, it is possible to prevent the thermal deterioration of the $CO_2$ absorption liquid 13. Also, even in a case where the liquid volume of the $CO_2$ absorption liquid 13 of the tower bottom part is reduced, the boot part 153 having a relatively smaller capacity than the main body part 151 is provided. Thus, since the distance between the liquid surface level of the $CO_2$ absorption liquid 13 at the lower part of the $CO_2$ absorption liquid regeneration tower 15 and the liquid feed tube 156 can be sufficiently secured, entrainment of gas within the $CO_2$ absorption liquid regeneration tower 15 can be prevented.

In the $CO_2$ recovery device 1 related to the present embodiment, it is preferable that the ratio (d2:d1) of the internal diameter d2 of the boot part 153 to the internal diameter d1 of the main body part 151 is within a range of 1:10 to 1:2. By virtue of this configuration, as described above, the $CO_2$ absorption liquid 13 required for the control of the liquid surface level of the $CO_2$ absorption liquid 13 can be efficiently reduced, the control of the liquid surface level of the $CO_2$ absorption liquid 13 becomes easy. The ratio (d2:d1) of the internal diameter d2 of the boot part 153 to the internal diameter d1 of the main body part 151 is more preferably 1:8 to 1:3, and still more preferably 1:5 from a viewpoint that the above-described effects are further improved.

Additionally, in the $CO_2$ recovery device 1 related to the present embodiment, it is preferable that the liquid flow speed of the $CO_2$ absorption liquid 13 to be fed from the inside of the boot part 153 to the $CO_2$ absorption tower 14 is equal to or lower than 0.3 m/s. By virtue of this configuration, even in a case where the liquid volume of the $CO_2$ absorption liquid 13 required for the control of the liquid surface level of the $CO_2$ absorption liquid is reduced by providing the $CO_2$ absorption liquid regeneration tower 15 with the boot part 153 having the relatively smaller internal diameter d2 than the main body part 151, it is possible to prevent entrainment of gas within the $CO_2$ absorption liquid regeneration tower 15 to the $CO_2$ absorption liquid 13 to be fed from the boot part 153. The liquid flow speed of the $CO_2$ absorption liquid 13 to be fed to the $CO_2$ absorption tower 14 from the inside of the boot part 153 is more preferably equal to or lower than 0.25 m/s, and still more preferably 0.20 m/s.

Figure 6:
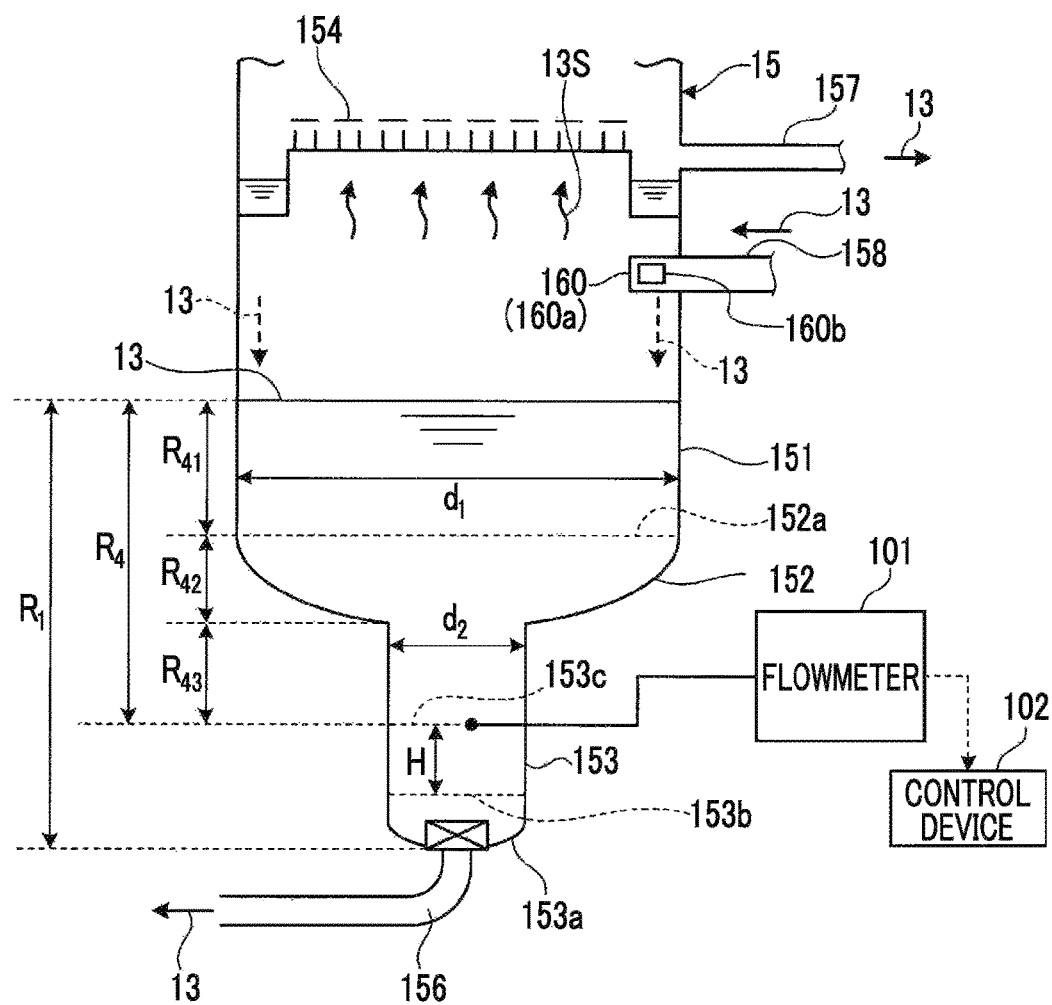
FIG. 6 is a view illustrating another configuration example of the $CO_2$ absorption liquid regeneration tower related to the present embodiment.

In addition, although an example in which the dispersion device 159 that is a substantially cylindrical member has the cutout part 159a provided at the central part thereof is used has been described in the above-described embodiment, the dispersion device is not limited to this configuration. FIG. 6 is a view illustrating another configuration example of the $CO_2$ absorption liquid regeneration tower 15 related to the present embodiment. In the example illustrated in FIG. 6, a dispersion device 160 in which a distal end forms a curved surface 160a (refer to FIGS. 7A and 7B) running along a peripheral surface of the main body part 151 and openings 160b are provided on both lateral sides is provided in the vicinity of a wall surface of the upper part of the main body part 151. The dispersion device 160 disperses the $CO_2$ absorption liquid 13, which is a gas-liquid mixture supplied from the liquid feed tube 158, to both lateral sides along the peripheral surface of the main body part 151 from the openings 160b (refer to FIG. 7A). Accordingly, since the $CO_2$ absorption liquid 13 flows down along the peripheral surface of the main body part 151, it is possible to prevent generation of bubbles when the $CO_2$ absorption liquid 13 that flows down inside the $CO_2$ absorption liquid regeneration tower 15 and the $CO_2$ absorption liquid 13 stored at the lower part of the $CO_2$ absorption liquid regeneration tower 15 have come into contact with each other, and entrainment of bubbles to the liquid feed tube 156 can be further prevented.

Figure 7A:
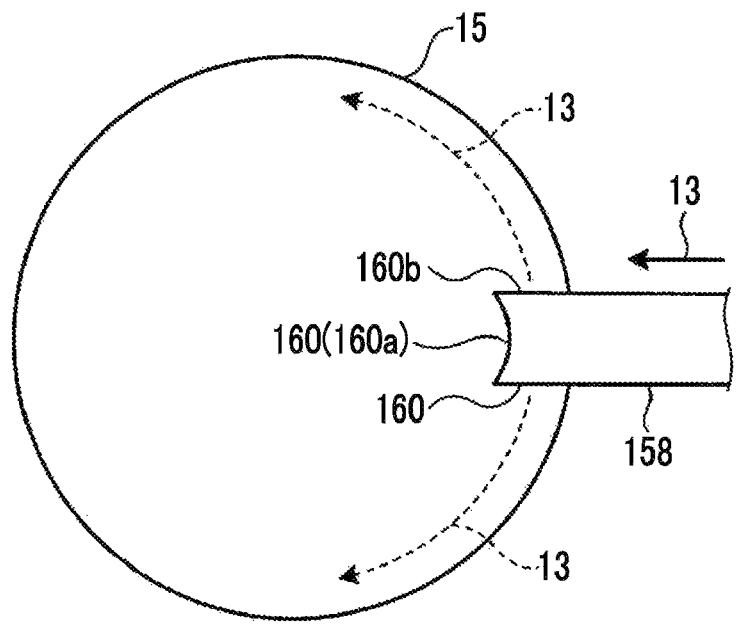
FIG. 7A is an explanatory view of a dispersion device related to the present embodiment.
Figure 7B:
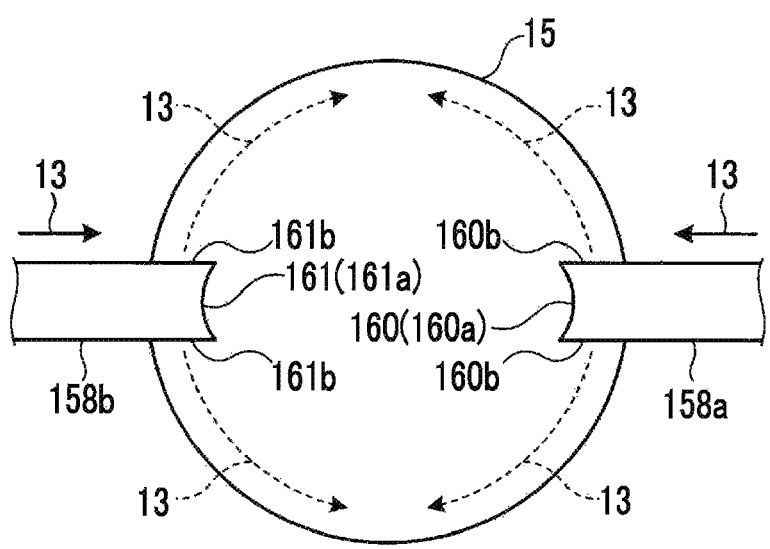
FIG. 7B is an explanatory view of the dispersion device related to the present embodiment.

In addition, although an example in which one dispersion device 160 is provided has been described in the example illustrated in FIG. 6, the invention is not limited to this configuration. As illustrated in FIG. 7A, in a case where the dispersion device 160 is used, the $CO_2$ absorption liquid 13 supplied from the liquid feed tube 158 is dispersed along a curved surface 160a at the distal end of the dispersion device 160 and is dispersed along curved surfaces on both lateral sides from the openings 160b provided on both the lateral sides. For this reason, as illustrated in FIG. 7B, another dispersion device 161 may be provided on a surface that faces the dispersion device 160 provided in the main body part 151. The dispersion device 161 has a curved surface 161a along the peripheral surface of the main body part 151, and openings 161b provided on both lateral sides, similar to the dispersion device 160. In this way, since the $CO_2$ absorption liquid 13 is dispersed by the dispersion device 160 connected to one liquid feed tube 158a and the dispersion device 161 connected to the other liquid feed tube 158b, respectively, by arranging the two dispersion devices 160 and 161 face to face, it is possible to efficiently disperse the $CO_2$ absorption liquid 13.

Next, the overall operation of the $CO_2$ recovery device 1 related to the present embodiment will be described. The exhaust gas 11A containing $CO_2$ exhausted from industrial facilities, such as a boiler and a gas turbine, is introduced into the cooling tower 12, and is brought into countercurrent contact with and cooled by the cooling water $W_1$. The cooled exhaust gas 11A is introduced into the $CO_2$ absorption tower 14 via the flue 16, and the flow rates of the exhaust gas 11A introduced into the $CO_2$ absorption tower 14 are measured. The exhaust gas 11A introduced into the $CO_2$ absorption tower 14 is brought into countercurrent contact with and cooled by the $CO_2$ absorption liquid 13 containing alkanolamine or the like in the $CO_2$ absorption section 141, and becomes the exhaust gas 11B from which $CO_2$ in the exhaust gas 11A has been absorbed by the $CO_2$ absorption liquid 13 and $CO_2$ has been removed.

The exhaust gas 11B from which $CO_2$ has been removed rises via the chimney tray 145, is brought into gas-liquid contact with the cleaning water $W_2$ supplied from the top part side of the washing section 142, and becomes the exhaust gas 11C from which the $CO_2$ absorption liquid 13 entrained in the exhaust gas 11B has been recovered by circulation cleaning. The exhaust gas 11C is exhausted to the outside from the tower top part 14a of the $CO_2$ absorption tower 14 after mist in the gas is trapped by the mist eliminator 146.

The $CO_2$ absorption liquid 13 (rich solution) that has absorbed $CO_2$ in the $CO_2$ absorption tower 14 is supplied to the upper part of the $CO_2$ absorption liquid regeneration tower 15 by the rich solvent pump 51 after being heat-exchanged with the $CO_2$ absorption liquid 13 (lean solution) in the rich-lean solution heat exchanger 52 via the rich solution supply tube 50. The $CO_2$ absorption liquid 13 supplied to the $CO_2$ absorption liquid regeneration tower has $CO_2$ removed therefrom and becomes a semi-lean solution, while flowing down to the tower bottom part via the $CO_2$ absorption liquid supply section 151. This semi-lean solution is circulated through the circulation line $L_4$, is heated by the saturated steam S in the regenerative heater 31, and becomes the $CO_2$ absorption liquid 13 (lean solution). The saturated steam S after being heated becomes the steam condensed water $W_4$. The $CO_2$ gas 41 removed from the $CO_2$ absorption liquid 13 is released to the outside as the $CO_2$ gas 44 from which the condensed water $W_5$ has been separated through the upper part of the separation drum 43 after the moisture thereof is condensed by the condenser 42.

The $CO_2$ absorption liquid 13 (lean solution) of the tower bottom part 15b of the $CO_2$ absorption liquid regeneration tower 15 is supplied to the upper part of the $CO_2$ absorption section 141 of the $CO_2$ absorption tower 14 by the lean solution pump 54 after being heat-exchanged with the $CO_2$ absorption liquid 13 (rich solution) by the rich-lean solution heat exchanger 52 via the lean solution supply tube 53. Here, the control device 102 controls the liquid surface level so as to fall within the predetermined range R4 between the upper part 153c of the boot part 153 and the main body part 151 according to the liquid surface level measured by the flowmeter 101. Here, the control device 102 performs a control so that, on the basis of relational expressions between liquid volumes and liquid surface levels that are respectively set in a range R41 of the main body part 151, a range R42 of the tank end 152, and the range R3 of the boot part, the liquid volumes and the liquid surface levels satisfy proportional relations in the total range R4. Accordingly, stable liquid surface level control becomes possible. In addition, it is preferable that the control device 102 makes the $CO_2$ absorption liquid 13 in the boot part 153 equal to or lower than 0.3 m/s from a viewpoint of preventing entrainment of gas at the time of feeding of the $CO_2$ absorption liquid 13.

As described above, according to the present embodiment, the tower bottom part of the $CO_2$ absorption liquid regeneration tower 15 is provided with the boot part 153 having a relatively smaller capacity than the main body part 151. Thus, the liquid volume of the $CO_2$ absorption liquid 13 required to be stably fed from the $CO_2$ absorption liquid regeneration tower 15 to the $CO_2$ absorption tower 14 can be reduced. Accordingly, the $CO_2$ recovery device 1 can reduce the residence time of the $CO_2$ absorption liquid 13 within the $CO_2$ absorption liquid regeneration tower 15, and can reduce the thermal deterioration of the $CO_2$ absorption liquid 13 at the time of regeneration. Moreover, in a case where the liquid volume of the $CO_2$ absorption liquid 13 is reduced, the boot part 153 having a relatively smaller capacity than the main body part 151 is provided below the main body part 151. Thus, the height of liquid surface level can be secured, and entrainment of gas within the $CO_2$ absorption liquid regeneration tower 15 accompanying feeding of the $CO_2$ absorption liquid 13 can be prevented. As a result of these, according to the present embodiment, by providing the tower bottom part 15b of the $CO_2$ absorption liquid regeneration tower 15 with the boot part 153, it is possible to reduce the liquid volume of the $CO_2$ absorption liquid 13 stored in the tower bottom part 15b of the $CO_2$ absorption liquid regeneration tower 15 by 50%, and it is possible to reduce the amount of loss of amine caused by thermal deterioration of the entire $CO_2$ absorption liquid regeneration tower 15 by 50%.

In addition, although an example in which the boot part 153 is provided as a cylindrical member has been described in the above-described embodiment, the shape of the boot part 153 is not limited to this configuration. The boot part 153 just has to be a member having a relatively smaller capacity than the main body part 151, and may be, for example, polygonal prismatic members, such as a triangular prism and a quadrangular prism.

Additionally, an example in which the exhaust gas 11A containing $CO_2$ exhausted from industrial facilities, such as a boiler and a gas turbine, is treated by the $CO_2$ absorption liquid 13 has been described in the above-described embodiment. However, as gases to be treated that is treated by the $CO_2$ absorption liquid 13, various gases can be applied if they are gases containing $CO_2$.

REFERENCE SIGNS LIST

1: $CO_2$ RECOVERY DEVICE
11A, 11B, 11C: EXHAUST GAS
12: COOLING TOWER
121: COOLING SECTION
122: HEAT EXCHANGER
123: CIRCULATION PUMP
13: $CO_2$ ABSORPTION LIQUID
13S: STEAM
14: $CO_2$ ABSORPTION TOWER
14a: TOWER TOP PART
14b: TOWER BOTTOM PART
141: $CO_2$ ABSORPTION SECTION
142: WASHING SECTION
144: LIQUID STORAGE SECTION
145: CHIMNEY TRAY
146: MIST ELIMINATOR
15: $CO_2$ ABSORPTION LIQUID REGENERATION TOWER
15a: TOWER TOP PART
151: $CO_2$ ABSORPTION LIQUID SUPPLY SECTION
152: TANK END
153: BOOT PART
153a: TANK END
153b: BOTTOM PART
153c: UPPER PART
154: CHIMNEY TRAY
155: SKIRT PART
156, 157, 158: LIQUID FEED TUBE
159, 160: DISPERSION DEVICE
159a: CUTOUT PART
160a: CURVED SURFACE
160b: OPENING
16: FLUE
21: HEAT EXCHANGER
22: CIRCULATION PUMP
23: ADJUSTING VALVE
24: HEAT EXCHANGER
31: REGENERATIVE HEATER
32: ADJUSTING VALVE
33: CIRCULATION PUMP
41, 44: $CO_2$ GAS
42: CONDENSER
43: SEPARATION DRUM
45: CONDENSED WATER CIRCULATION PUMP
50: RICH SOLUTION SUPPLY TUBE
51: RICH SOLVENT PUMP
52: RICH-LEAN SOLUTION HEAT EXCHANGER
53: LEAN SOLUTION SUPPLY TUBE
54: LEAN SOLUTION PUMP
55: COOLING SECTION
101: FLOWMETER
102: CONTROL DEVICE
103: $CO_2$ CONCENTRATION METER
$L_1$, $L_2$, $L_4$: CIRCULATION LINE
$L_3$: EXTRACTION LINE
$L_5$: GAS EMISSION LINE
$L_6$: CONDENSED WATER LINE
S: SATURATED STEAM
$W_1$: COOLING WATER
$W_2$, $W_3$: CLEANING WATER
$W_4$: STEAM CONDENSED WATER
$W_5$: CONDENSED WATER

The invention claimed is:
1. A $CO_2$ recovery method comprising:
a $CO_2$ absorption process of bringing a gas to be treated into contact with a $CO_2$ absorption liquid, thereby causing $CO_2$ contained in the gas to be treated to be absorbed by the $CO_2$ absorption liquid; and
a $CO_2$ absorption liquid regeneration process of heating the $CO_2$ absorption liquid, which has absorbed $CO_2$, in a $CO_2$ absorption liquid regeneration tower, to release $CO_2$ from the $CO_2$ absorption liquid to regenerate the $CO_2$ absorption liquid,
wherein the $CO_2$ absorption liquid regeneration process includes measuring a liquid surface level of the $CO_2$ absorption liquid in a second storage part which is to be supplied from the $CO_2$ absorption liquid regeneration tower to the $CO_2$ absorption tower, and controlling the liquid surface level of the $CO_2$ absorption liquid between a first storage part and the second storage part on the basis of the measured liquid surface level.
2. The $CO_2$ recovery method according to claim 1, wherein an internal diameter d2 of the second storage part is relatively smaller than an internal diameter d1 of the first storage part.
3. The $CO_2$ recovery method according to claim 1, wherein a ratio (d2:d1) of the internal diameter d2 of the second storage part to the internal diameter d1 of the first storage part is within a range of 1:10 to 1:2.
4. The $CO_2$ recovery method according to claim 1, wherein the second storage part is a cylindrical member provided at a bottom part of the $CO_2$ absorption liquid regeneration tower.
5. The $CO_2$ recovery method according to claim 1, wherein a liquid flow speed of the $CO_2$ absorption liquid to be fed from the inside of the second storage part to the $CO_2$ absorption tower is equal to or lower than 0.3 m/s.

* * * * *